J. D. HUMPHREY.
LAWN SPRINKLER.
APPLICATION FILED NOV. 6, 1916.

1,219,641.

Patented Mar. 20, 1917.

Inventor
John D. Humphrey
By
Attorney

UNITED STATES PATENT OFFICE.

JOHN D. HUMPHREY, OF NORFOLK, CONNECTICUT.

LAWN-SPRINKLER.

1,219,641.

Specification of Letters Patent.

Patented Mar. 20, 1917.

Application filed November 6, 1916. Serial No. 129,716.

*To all whom it may concern:*

Be it known that I, JOHN D. HUMPHREY, a citizen of the United States, residing at Norfolk, in the county of Litchfield and State of Connecticut, have invented certain new and useful Improvements in Lawn-Sprinklers, of which the following is a specification.

This invention relates to what I shall for convenience term a "lawn sprinkler," the object of the invention being to provide an article of this character which is susceptible of inexpensive manufacture and which has means of an effective nature for uniformly distributing water or other liquid over a definite or described area in a gentle manner.

In the drawings accompanying and forming part of the present specification I have shown in detail one convenient form of embodiment of the invention which will be set forth fully in the following description. I do not restrict myself, however, to this particular disclosure; I may depart therefrom in several respects within the scope of the invention defined by the claim following said description.

Referring to said drawings.

Figure 1:
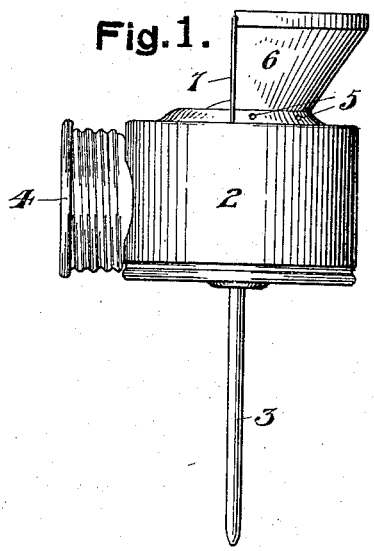
Figure 1 is a side elevation of a lawn sprinkler involving the invention.
Figure 2:
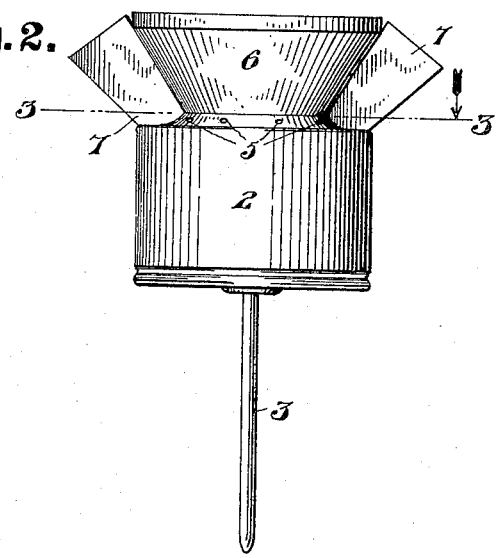
Fig. 2 is a rear elevation of the same.
Figure 3:
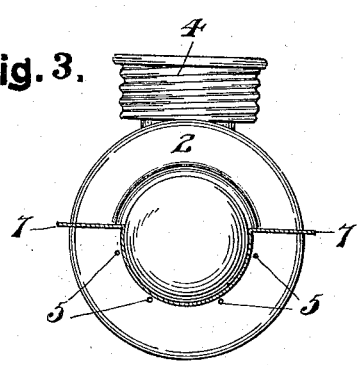
Fig. 3 is a horizontal section on the line 3—3 of Fig. 1.
Figure 4:
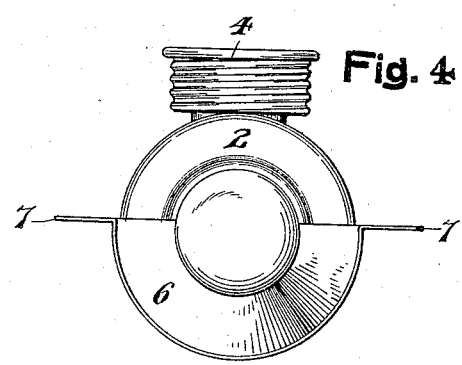
Fig. 4 is a top plan view.
Figure 5:
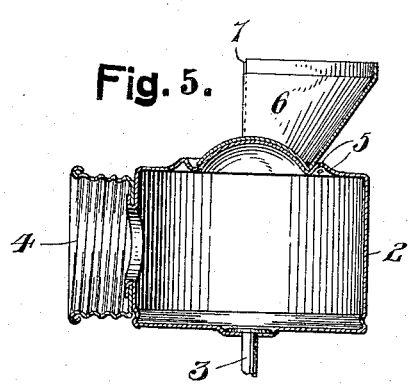

Fig. 5 a vertical section.

Like characters refer to like parts throughout the several views.

The article constituting the subject matter of the present case is capable of general use, although it is of particular advantage when used for sprinkling a lawn, being intended to direct a body of water or it might be any any other suitable liquid such for instance as a germicide over a prescribed area; for instance half a circle. When used as a lawn sprinkler, the device is equipped with means for holding it in a fixed position. This means may be of any suitable character, for instance a penetrating element which depends from the body or casing of the sprinkler head and which is thrust into the lawn or it may be anything of a similar character. When the sprinkler is mounted, and when it is supplied with the necessary liquid, this liquid is directed onto the lawn or other surface.

With the foregoing general observations I shall now more particularly refer to what is illustrated. The device includes in its construction a casing or boxing as 2 which as shown is of practically cylindrical form. Although this shape is a good one the casing, which constitutes the head of the article, may be of any other suitable shape. The positioning element is denoted by 3, and it may as shown consist of an ordinary nail driven through a perforation or opening in the bottom of the casing or head 2, the wall of the hole or opening tightly embracing the shank of the nail just below its head in the manner shown in Letters Patent 904,250, granted jointly to J. H. Atkins and myself on November 17, 1908. Water or other liquid can be supplied to the casing or head 2 in any desirable way, for instance by the nipple 4 adapted for connection with a hose or other suitable source of liquid supply; as represented the nipple is interiorly threaded to provide for the union therewith of a hose or other connection. The liquid whether water or something else is discharged from the casing or head 2 in some suitable manner as through the perforations or needle openings 5 which may as shown be formed in the top of the casing or head 2, it being understood that when the supply of liquid is on this liquid is discharged from the head in a multiplicity of jets.

The jets of liquid issuing from these spray or needle openings 5 are positively directed by what I term a spreader such as 6. This spreader is semi-circular in cross section, being in the form of a shell or flange rising from the top of the head 2 in an angular manner extending in an upward forward direction from its point of juncture with the said top. In fact the spreader may be described as consisting of a half inverted frusto-conical shell. In some cases it might be a solid but being in the form of a shell is a preferable construction, owing to the fact that it is an inexpensive one, more so in fact than where it is made solid. The reduced base of this spreader is of a less diameter than that of the casing or head 2. The needle openings 5 are in front of and adjacent to the base of the spreader. When liquid in fine streams issues from these perforations or orifices 5, it strikes the spreader and is diverted in a forward direction in the form of a comparatively fine spray or mist.

In the construction shown the spreader is shown provided at its ends with similar wings 7. These wings are in alinement transversely of the sprinkler and extend outwardly from the spreader diametrically of the head 2. These wings or flanges extending outwardly beyond the head, their outer or side edges converging downwardly and their upper edges diverging downwardly. These wings or flanges prevent effectually the flow of the water or other liquid backwardly, the consequences being that a given area will be sprinkled. In the present instance this area is practically a half circle. Its radius may be varied in accordance with the size of the needle openings 5 or the pressure of the water. In fact it is not essential that I spray this particular area. The surface covered, however, is practically half a circle. The wings or flanges 7 which I have alluded to prevent as set forth the rearward flow of the water, the consequence being that the area back of the sprinkler is left dry or comparatively so, certainly dry with respect to the front, so that one can reach the sprinkler without fear of the feet becoming wet, when it becomes necessary to change the position of the device. The sprinkler can also be held in the hand, and the wings or flanges act as guards to prevent the user from becoming wet while manipulating the sprinkler.

I deem it desirable to call attention to the fact that some of the water or other liquid issuing from the openings or perforations 5 is deflected against the wings 7 and is directed by them laterally.

What I claim is:

A sprinkler comprising a head having perforations in its top, an inclined spreader rising from the top, the spreader being approximately semi-circular in cross section and having outwardly disposed wings at its ends, extending across and against the top, the outer edges of the wings converging downwardly, the wings being approximately midway of the front and rear of the head, the perforations being in front of the base of the spreader for the passage of the liquid whereby the liquid deflected against the wings is directed laterally.

In testimony whereof I affix my signature in the presence of two witnesses.

JOHN D. HUMPHREY.

Witnesses:
PAUL B. ELMORE,
EVELYN CLOTZMAN.

Copies of this patent may be obtained for five cents each, by addressing the "Commissioner of Patents, Washington, D. C."